United States Patent
Suh et al.

(10) Patent No.: US 11,943,306 B2
(45) Date of Patent: Mar. 26, 2024

(54) METHOD AND DEVICE FOR SUPPORTING ALTERNATIVE NETWORK SLICE IN WIRELESS COMMUNICATION SYSTEM

(71) Applicant: Samsung Electronics Co., Ltd., Suwon-si (KR)

(72) Inventors: Dongeun Suh, Suwon-si (KR); Hoyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/049,554

(22) Filed: Oct. 25, 2022

(65) Prior Publication Data

US 2023/0130966 A1  Apr. 27, 2023

(30) Foreign Application Priority Data

Oct. 26, 2021  (KR) .......................... 10-2021-0143829
Apr. 6, 2022  (KR) .......................... 10-2022-0042905

(51) Int. Cl.
*H04L 67/141* (2022.01)

(52) U.S. Cl.
CPC .................................. *H04L 67/141* (2013.01)

(58) Field of Classification Search
CPC ..... H04L 67/141; H04L 67/14; H04L 67/148; H04L 47/70
See application file for complete search history.

(56) References Cited

U.S. PATENT DOCUMENTS

| | | | |
|---|---|---|---|
| 11,388,068 B1 * | 7/2022 | Balmakhtar | H04L 43/0882 |
| 2018/0199398 A1 * | 7/2018 | Dao | H04W 76/27 |
| 2018/0367980 A1 * | 12/2018 | Lee | H04L 67/51 |
| 2019/0159015 A1 * | 5/2019 | Qiao | H04L 41/0893 |
| 2019/0306251 A1 * | 10/2019 | Talebi Fard | H04W 76/10 |
| 2019/0357129 A1 | 11/2019 | Park et al. | |
| 2020/0120022 A1 * | 4/2020 | Stammers | H04L 12/4633 |
| 2020/0214054 A1 * | 7/2020 | Qiao | H04W 48/18 |
| 2020/0296569 A1 * | 9/2020 | Kumar | H04W 4/027 |
| 2021/0037426 A1 | 2/2021 | Zhu et al. | |
| 2021/0136674 A1 * | 5/2021 | Lee | H04L 41/5009 |
| 2021/0136715 A1 * | 5/2021 | Jeong | H04W 60/00 |
| 2021/0144790 A1 * | 5/2021 | Faccin | H04W 60/00 |
| 2021/0289403 A1 | 9/2021 | Suh et al. | |
| 2021/0368421 A1 * | 11/2021 | Venkataraman | H04L 63/0892 |

(Continued)

FOREIGN PATENT DOCUMENTS

| | | | | |
|---|---|---|---|---|
| AU | 2018289916 A1 * | 2/2020 | | F02B 13/10 |
| CN | 109673031 A * | 4/2019 | | H04L 67/14 |

(Continued)

OTHER PUBLICATIONS

Apple, "Providing alternative S-NSSAI(s) to the UE in EPC to 5GC interworking," S2-2104723, 3GPP TSG-WG SA2 Meeting #145-e, May 17-28, 2021, 3 pages.

(Continued)

*Primary Examiner* — Alina A Boutah

(57) ABSTRACT

The disclosure relates to a 5G or 6G communication system for supporting a higher data transmission rate. Provided is a method of solving a problem in which PDU session creation is rejected due to an NSAC in a wireless communication system according to an embodiment of the disclosure through alternative S-NSSAI.

14 Claims, 6 Drawing Sheets

(56) References Cited

U.S. PATENT DOCUMENTS

| | | | |
|---|---|---|---|
| 2022/0312305 A1* | 9/2022 | Lee | H04W 28/18 |
| 2023/0022184 A1* | 1/2023 | Sajjan | H04W 48/02 |
| 2023/0063570 A1* | 3/2023 | Gundavelli | H04W 40/02 |

FOREIGN PATENT DOCUMENTS

| | | | | |
|---|---|---|---|---|
| CN | 113163457 A | * | 7/2021 | H04W 28/26 |
| CN | 113472724 A | * | 10/2021 | |
| JP | 2022546669 A | * | 11/2022 | |
| KR | 20180081969 A | * | 7/2018 | |
| KR | 20200031182 A | * | 3/2020 | H04L 67/04 |
| KR | 10-2021-0116141 A | | 9/2021 | |
| KR | 20220135130 A | * | 10/2022 | H04L 67/14 |
| WO | 2020064242 A1 | | 4/2020 | |
| WO | WO-2020064242 A1 | * | 4/2020 | H04W 24/08 |
| WO | WO-2020080913 A1 | * | 4/2020 | H04W 48/08 |
| WO | WO-2021129996 A1 | * | 7/2021 | H04L 67/14 |
| WO | WO-2021183870 A1 | * | 9/2021 | H04W 48/18 |

OTHER PUBLICATIONS

Lenovo et al., "NSAC for maximum number of PDU Sessions for EPC IWK," S2-2107735, 3GPP TSG-WG SA2 Meeting #147E e-meeting, Oct. 18-22, 2021, 4 pages.

International Search Report and Written Opinion of the International Searching Authority dated Jan. 30, 2023, in connection with International Patent Application No. PCT/KR2022/016334, 8 pages.

\* cited by examiner

METHOD AND DEVICE FOR SUPPORTING ALTERNATIVE NETWORK SLICE IN WIRELESS COMMUNICATION SYSTEM

CROSS-REFERENCE TO RELATED APPLICATIONS

This application is based on and claims priority under 35 U.S.C. § 119 to Korean Patent Application No. 10-2021-0143829, filed on Oct. 26, 2021, and 10-2022-0042905, filed on Apr. 6, 2022, in the Korean Intellectual Property Office, the disclosures of which are herein incorporated by reference in their entireties.

BACKGROUND

1. Field

The disclosure relates to a method and device for supporting an alternative network slice in a wireless communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and artificial intelligence (AI) from the design stage and internalizing end-to-end AI support functions, and next-generation distributed computing technology for implementing services at levels of complexity exceeding the limit of UE operation capability by utilizing ultra-high-performance communication and computing resources.

SUMMARY

There may occur a case in which protocol data unit (PDU) session creation is rejected due to admission control on the maximum number of PDU sessions per network slice (i.e., network slice admission control (NSAC) on the maximum number of PDU sessions) in a PDU session creation procedure. In particular, when PDU session creation through a specific slice (e.g., S-NSSAI), which is an NSAC target is concentrated for a certain period of time and reaches the maximum number of established PDU sessions for the corresponding slice, many PDU session creation requests may be all rejected to the corresponding slice according to NSAC. Therefore, there is a need for a method for alleviating rejection of a PDU session creation request due to NSAC.

Technical problems to be achieved in the disclosure are not limited to the above-described technical problems, and other technical problems not mentioned may be clearly understood by those of ordinary skill in the art to which the disclosure belongs from the description below.

In accordance with an aspect of the disclosure, a method performed by an access and mobility management function (AMF) in a communication system is provided. The method comprises: receiving, from a terminal, a first message for requesting an establishment of a protocol data unit (PDU) session associated with a first network slice; identifying whether the first network slice is not available; in case that the first network slice is not available, selecting a second network slice alternative to the first network slice; and transmitting, to a session management function (SMF) associated with the second network slice, a second message for establishing the PDU session.

In one embodiment, the method further comprises selecting the SMF based on the second network slice.

In one embodiment, the first message comprises single-network slice selection assistance information (S-NSSAI) of the first network slice.

In one embodiment, the method further comprises receiving, from a unified data management (UDM), information on at least one network slice and information on at least one alternative network slice associated with each of the at least one network slice.

In one embodiment, the identifying whether the first network slice is not available comprises: receiving, from a SMF, a third message comprising information indicating whether the first network slice is not available; and identifying whether the first network slice is not available based on the information.

In one embodiment, the third message further comprises information on the second network slice which is an alternative network slice of the first network slice.

In one embodiment, in case that a number of established PDU session is equal to a maximum number of PDU session for the first network slice or a number of registered terminal is equal to a maximum number of available terminal for the first network slice, the first network slice is not available.

The disclosure also provides an access and mobility management function (AMF) in a communication system. The AMF comprises: t a transceiver; and a controller coupled with the transceiver and configured to: receive, from a terminal, a first message for requesting an establishment of a protocol data unit (PDU) session associated with a first network slice, identify whether the first network slice is not available, in case that the first network slice is not available, select a second network slice alternative to the first network slice, and transmit, to a session management function (SMF) associated with the second network slice, a second message for establishing the PDU session.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

In the drawings, the same or similar reference numerals may be used for the same or similar components.

DETAILED DESCRIPTION

Figure 1:
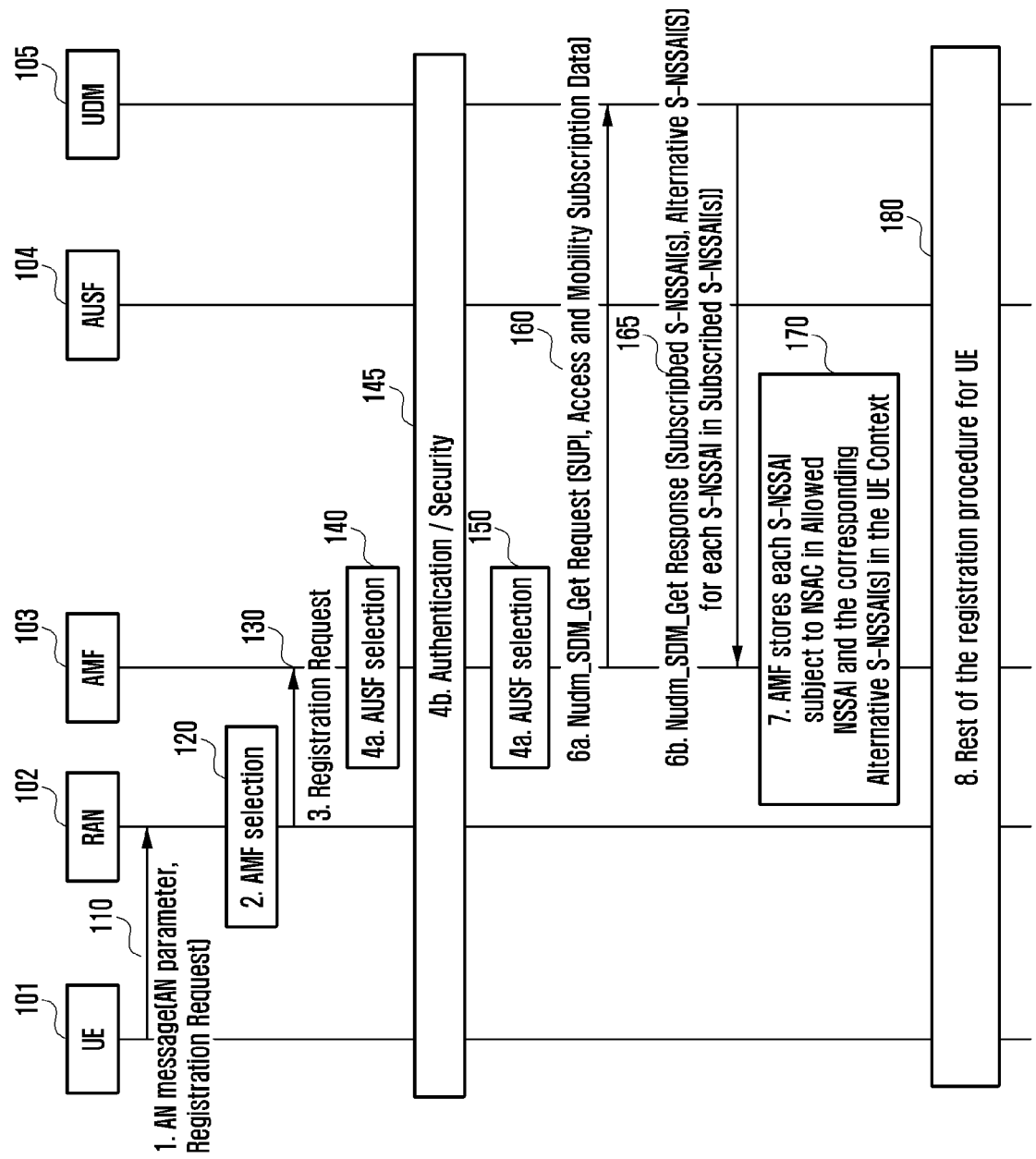
FIG. 1 illustrates a method in which an AMF receives alternative S-NSSAI information in a registration procedure when alternative S-NSSAI information is defined and provided in access and mobility (AM) subscription data of an UDM according to an embodiment of the present disclosure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, an operating principle of the disclosure will be described in detail with reference to the accompanying drawings. In the following description, in describing the disclosure, in the case that it is determined that a detailed description of a related well-known function or constitution may unnecessarily obscure the gist of the disclosure, a detailed description thereof will be omitted. Terms described below are terms defined in consideration of functions in the disclosure, which may vary according to intentions or customs of users and operators. Therefore, the definition should be made based on the content throughout this specification.

In the following description, in describing the disclosure, in case that it is determined that a detailed description of a related well-known function or constitution may unnecessarily obscure the gist of the disclosure, a detailed description thereof will be omitted. Hereinafter, embodiments of the disclosure will be described with reference to the accompanying drawings.

Hereinafter, a term identifying an access node used in the description, a term indicating network entities, a term indicating messages, a term indicating an interface between network objects, a term indicating various types of identification information and the like are exemplified for convenience of description. Accordingly, the disclosure is not limited to the terms described below, and other terms indicating objects having equivalent technical meanings may be used.

A 5G mobile communication network is composed of a 5G user equipment (UE, terminal, and the like), 5G radio access network (RAN, base station, 5g nodeB (gNB), evolved nodeB (eNB), and the like), and 5G core network. The 5G core network is composed of an access and mobility management function (AMF) that provides a mobility management function of a UE, a session management function (SMF) that provides a session management function, a user plane function (UPF) that performs a data transmission role, a policy control function (PCF) that provides a policy control function, a unified data management (UDM) that provides a data management function such as subscriber data and policy control data, and a network function such as unified data repository (UDR) that stores data of various network functions such as the UDM.

In a 5G system, network slicing refers to a technology and structure that enables virtualized, independent, and multiple logical networks in one physical network. A network operator provides a service by constituting a virtual end-to-end network of a network slice in order to satisfy specialized requirements of a service/application. In this case, the network slice may be identified by an identifier of single-network slice selection assistance information (S-NSSAI). The network may transmit information (e.g., allowed NSSAI(s)) on an allowed slice set to a terminal during a terminal registration procedure (e.g., UE registration procedure), and the terminal may transmit and receive application data through a protocol data unit (PDU) session generated through one S-NSSAI (i.e., network slice) thereof.

In the 5G system, there exists a network slice admission control (NSAC) function that enables each of the number of registered UEs per network slice and the number of established PDU sessions (e.g., each of number of registered UEs per network slice and number of established PDU session per network slice) to not exceed a defined maximum value.

For an admission control on the maximum number of registered UEs per network slice, whenever a change (addition or deletion of S-NSSAI) of the set (allowed NSSAI) of S-NSSAI allowed to the UE is required, the AMF may update (request to increase or decrease) the number of registered UEs for corresponding slices to an NSAC function (NSACF). When the NSACF receives an increase update request from the AMF for S-NSSAI that has reached the preconfigured maximum number of registered UEs per network slice, the NSACF may provide, to the AMF, information that the corresponding S-NSSAI has reached the maximum number of registered UEs. When the AMF receives the corresponding information, the AMF may exclude the corresponding S-NSSAI from the allowed S-NSSAI set.

For an admission control on the maximum number of PDU sessions per network slice, the SMF may update (request to increase or decrease) the number of PDU sessions established for the S-NSSAI to the NSAC function (NSACF) when performing a PDU session creation or release procedure for the S-NSSAI. When the NSACF receives an increase update request from the SMF for S-NSSAI that has reached the preconfigured maximum number of established PDU sessions per network slice, the NSACF may provide, to the SMF, information that the S-NSSAI has reached the maximum number of established PDU sessions. When the SMF receives the corresponding information, the SMF may not perform PDU session creation through the corresponding S-NSSAI. NSAC target information for each S-NSSAI may be configured in the AMF and the SMF, and the AMF and the SMF may perform an NSAC procedure only for S-NSSAI, which is an NSAC target.

FIG. 1 illustrates a method in which an AMF receives alternative S-NSSAI information in a registration procedure when alternative S-NSSAI information is defined and provided in access and mobility (AM) subscription data of an UDM according to an embodiment of the present disclosure.

With reference to FIG. 1, a UE 101 may transmit a message to a base station (RAN, gNB) 102 for a UE registration procedure (step 110). In this case, the message for the UE registration procedure may be an AN message (AN parameter, registration request). Here, the AN message represents a message between the UE 101 and the RAN 102. In this case, the registration request message may include at least one of information such as a UE identifier (e.g., subscription concealed identifier (SUCI), 5G-globally unique temporary identity (5G-GUTI), or permanent equipment identifier (PEI)), requested NSSAI, and UE mobility management (MM) core network capability.

The RAN 102 may select an AMF 103 based on information in the AN message received from the UE 101 (step 120).

The RAN 102 may transmit an N2 message (which may include at least one of N2 parameters or a registration request) to the AMF 103 (step 130). The N2 parameter may include a selected PLMN ID, UE position information, UE context request, and the like.

When determining that UE authentication is required, the AMF 103 may select an authentication server function (AUSF) 104 based on at least one of a UE identifier (e.g., SUCI or subscription permanent identifier (SUPI)) (step 140).

The AMF 103 may perform an authentication procedure for the UE 101 through the selected AUSF 104 (step 145). Further, when there is no non-access stratum (NAS) security context for the UE 101, a procedure for obtaining the NAS security context may be performed.

The AMF 103 may select an UDM 105 based on SUPI when subscription information for the UE 101 is required, and the UDM 105 may select a UDR (not illustrated) in which subscription information on the UE 101 is stored (step 150).

The AMF 103 may request access and mobility subscription information on the UE 101 to the UDM 105 through an Nudm_SDM_Get request (which may include at least one of SUPI or access and mobility subscription data) message (step 160).

In this case, information requesting alternative slice information (e.g., alternative S-NSSAI(s)) may be included in the Nudm_SDM_Get request message in the following cases: determination according to a local configuration of the AMF 103, in the case that a UE registration procedure in progress is a registration due to a movement from an EPS to 5GS, and the like.

The UDM 105 may transmit subscription information including subscribed S-NSSAI(s), alternative slice information (e.g., alternative S-NSSAI(s) for each S-NSSAI in subscribed S-NSSAI(s)) in an Nudm_SDM_Get response message to the AMF 103 (step 165). In this case, the alternative S-NSSAI information may be defined in access and mobility (AM) subscription data of the Nudm_SDM_Get response message and transmitted to the AMF 103.

The UDM 105 may include alternative S-NSSAI(s) in the Nudm_SDM_Get response message in the following case: determination according to a local configuration of the UDM 105, the case that the AMF 103 requests alternative S-NSSAI(s), and the like.

In this case, according to an embodiment, the UDM 105 may obtain information to transmit to the AMF 103 from the UDR and transmit the information to the AMF 103.

The AMF 103 may calculate allowed NSSAI in consideration of subscribed S-NSSAI(s) and store the allowed NSSAI in the UE context (step 170).

Further, for S-NSSAI, which is NSAC targets among S-NSSAIs in allowed NSSAI, the AMF 103 may store alternative S-NSSAI(s) for each S-NSSAI in the UE context. In the case that the AMF 103 intends to use an alternative slice in an unavailable slice occurring situation (e.g., slice congestion situation occurs, and the like) due to NSAC rejection or other reasons, the AMF 103 may store an alternative slice (alternative S-NSSAI(s) for each S-NSSAI) in the UE context for subscribed S-NSSAI(s) or allowed NSSAI. The AMF 103 may utilize alternative S-NSSAI(s) for each S-NSSAI stored for determining a slice (i.e., target slice) to be used instead of an unavailable slice, and move PDU sessions to a target slice when requesting PDU session generation/modification and handover to an unavailable slice.

The remaining registration procedure of the UE 101 may be proceeded (step

In one embodiment illustrated in FIG. 1, the UE 101 receives an allowed set of slices through a registration procedure (UE registration procedure), then selects a slice within the corresponding set for each PDU session to be created, and creates a PDU session through a PDU session creation procedure. When an alternative slice (e.g., alternative S-NSSAI) is provided through the registration procedure, as illustrated in FIG. 1, because signaling for providing an alternative slice for each PDU session creation procedure is not required, there is an advantage that a signaling load is small.

Figure 2:
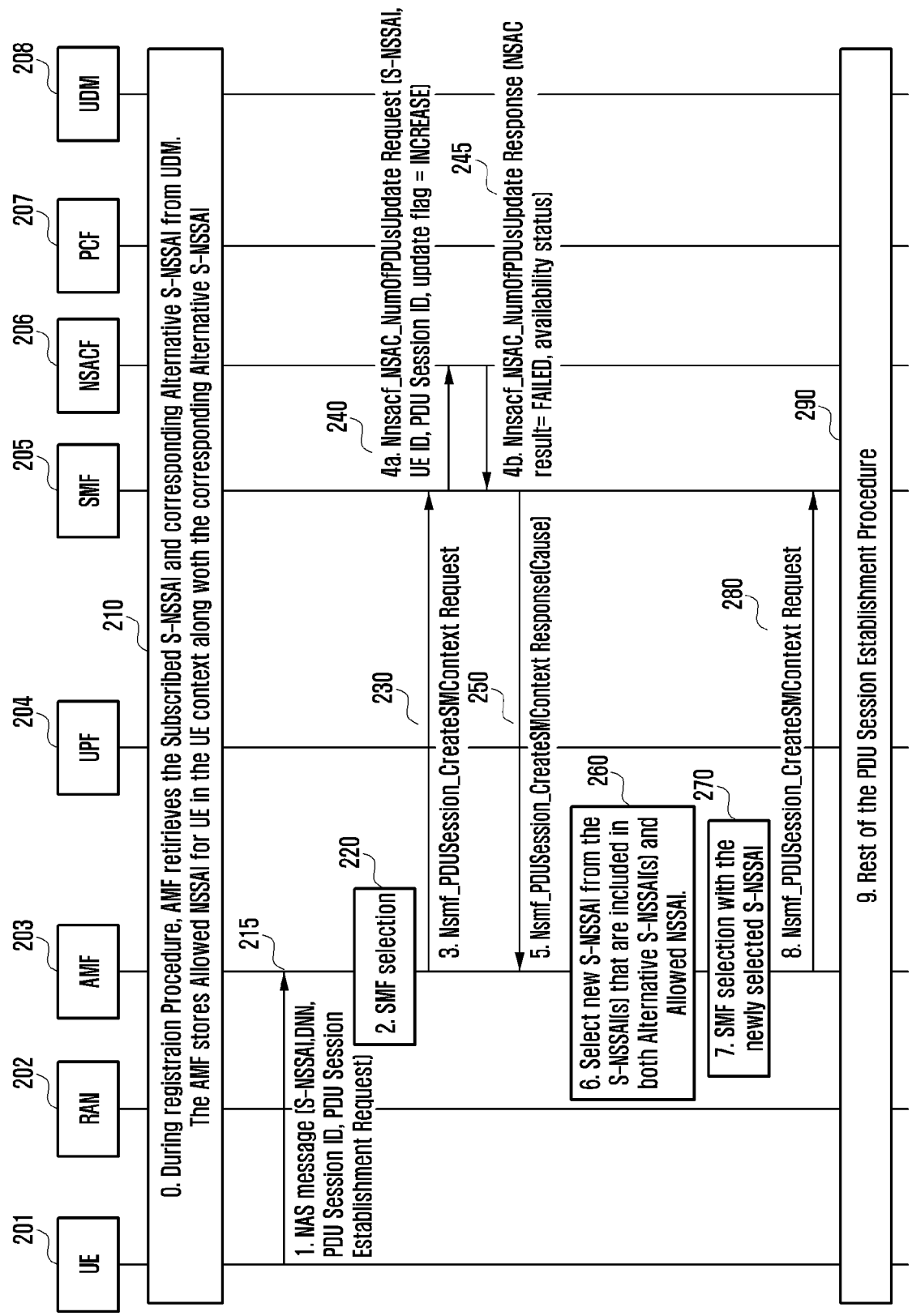
FIG. 2 illustrates a method in which an AMF selects again S-NSSAI for a PDU session through alternative S-NSSAI information in a PDU session establishment procedure when alternative S-NSSAI information is defined and provided in access and mobility (AM) subscription data of an UDM according to an embodiment of the present disclosure.

FIG. 2 illustrates a method in which an AMF selects again S-NSSAI for a PDU session through alternative S-NSSAI information in a PDU session establishment procedure when alternative S-NSSAI information is defined and provided in access and mobility (AM) subscription data of an UDM according to an embodiment of the present disclosure.

With reference to FIG. 2, in a UE registration procedure, an AMF 203 may store allowed NSSAI and alternative S-NSSAI(s) information for each S-NSSAI, which is an NSAC target in the allowed NSSAI in a UE context in AMF (step 210). This may be performed according to an embodiment described in relation to FIG. 1.

A UE 201 may transmit a request message to the AMF 203 (through a base station 202) for a PDU session establishment procedure (step 215). The message may be a PDU session establishment request message, and the PDU session establishment request message may be included in a non-access stratum (NAS) message and transmitted to the AMF 203. The NAS message means a message between the UE 201 and the AMF 203. According to an embodiment, the NAS message may include at least one of S-NSSAI, a data network name (DNN), or a PDU session ID.

In the case that S-NSSAI included in the message received from the UE 201 is currently unavailable in step 250, the AMF 203 may not select an SMF 205 and in this case, steps 230, 240, and 250 may be omitted and the procedure from step 260 may be proceeded. The AMF 203 may select the SMF 205 based on at least one of the DNN or the S-NSSAI (step 220).

The AMF 203 may transmit an Nsmf_PDUSession_CreateSMContext request to the selected SMF 205. According to an embodiment, the Nsmf_PDUSession_CreateSMContext request message may include at least one of S-NSSAI, a DNN, a PDU session ID, or a PDU session establishment request message (step 230).

When S-NSSAI included in the message received from the AMF 203 is a network slice admission control (NSAC) target, the SMF 205 may transmit an Nnsacf_NSAC_NumOfPDUsUpdate request (which may include at least one of S-NSSAI, a UE ID, a PDU session ID, or an update flag=INCREASE) message to an NSAC function (NSACF) 206 (step 240).

In the case that an update flag value of the received message is INCREASE and the number of PDU sessions established for S-NSSAI of the received message has already reached the maximum number of PDU sessions established for the S-NSSAI, the NSACF 206 may include a value indicating that the maximum number of PDU sessions established has already been reached in the result value and transmit the result value to the SMF 205 (step 245). In this case, the message may be an Nnsacf_NSA_NumOfPDUsUpdate response message.

The SMF 205 may transmit an Nsmf_PDUSession_CreateSMContext response message to the AMF 203 (step 250). In this case, a cause of the message may include information indicating that session management (SM) context creation has failed due to reaching the maximum number of PDU sessions established for the S-NSSAI.

When information indicating that SM context creation has failed due to reaching the maximum number of PDU sessions established for S-NSSAI is included in a cause value of the message from the SMF 205, or in the case that the AMF 203 determines that S-NSSAI included in the message from the UE 201 is unavailable in step 220, the AMF 203 may select one of S-NSSAI(s) included in allowed NSSAI among alternative S-NSSAI(s) for the failed or unavailable S-NSSAI to attempt again PDU session creation (step 260).

The alternative S-NSSAI(s) may be stored in the AMF 203 in the following form: stored in an AMF local configuration, stored in the UE context of the AMF 203, and the like.

The AMF 203 may select again an SMF based on the newly selected S-NSSAI (step 270). Although the drawing illustrates that the same SMF as that selected in step 220 is selected in step 270, the SMF selected in step 220 and the SMF selected in step 270 may be the same or different.

The AMF 203 may transmit an Nsmf_PDUSession_CreateSMContext request message to the newly selected SMF (step 280). FIG. 2 illustrates several SMFs as one SMF for convenience of description. The SMF newly selected by the AMF 203 in step 270 may be an SMF different from that selected by the AMF 203 in step 220.

The remaining PDU session creation procedure may be proceeded (step 290).

In one embodiment illustrated in FIG. 2, in a situation in which an alternative slice (e.g., alternative-SNSSAI) is provided in advance through a registration procedure (e.g., by the method illustrated in FIG. 1), it indicates that the alternate slice is used for a PDU session, and because signaling for providing an alternate slice for each PDU session creation procedure is not required, there is an advantage that a signaling load is small.

Figure 3:
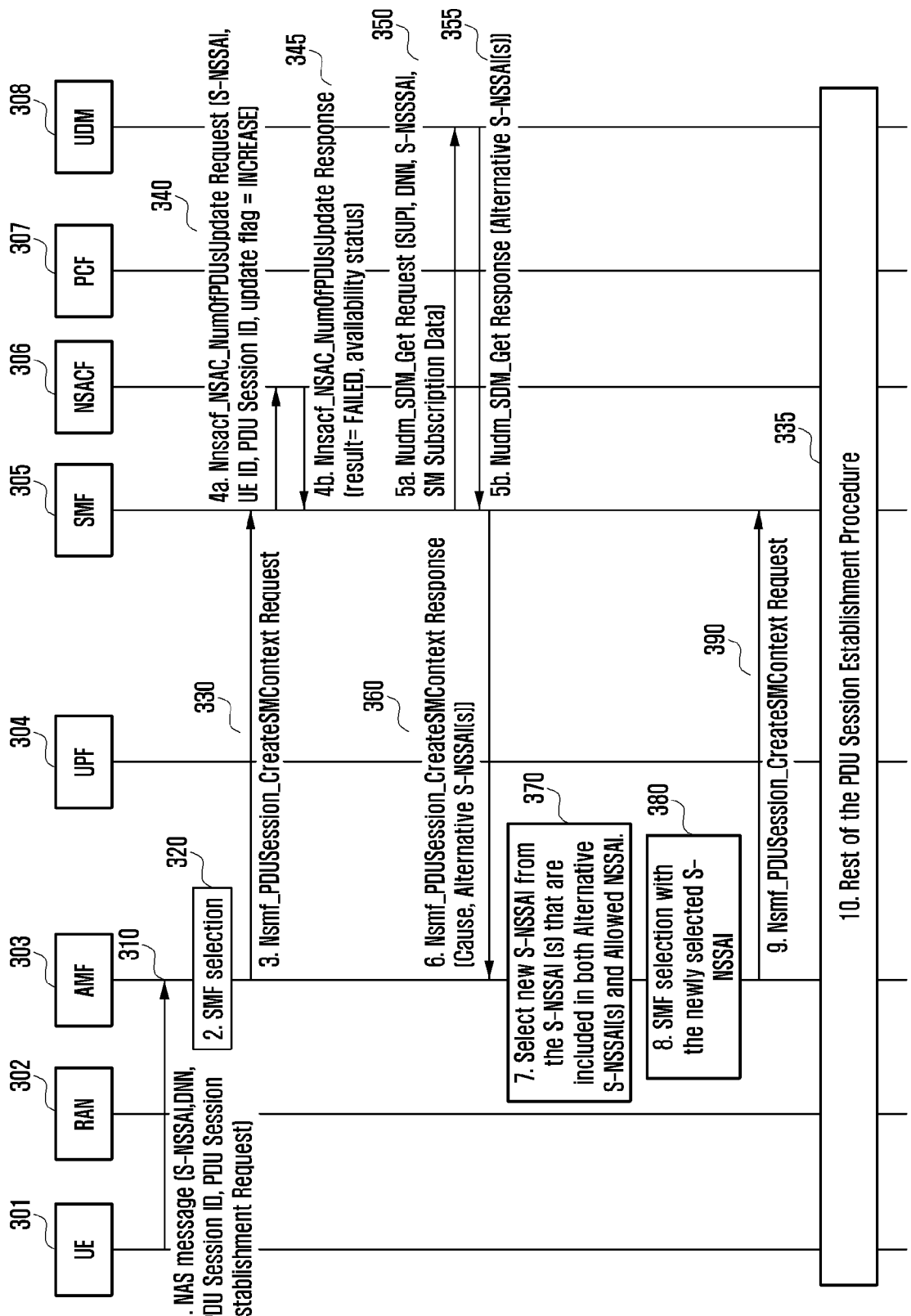
FIG. 3 illustrates a method in which an AMF selects again S-NSSAI for a PDU session through alternative S-NSSAI information in a PDU session establishment procedure when alternative S-NSSAI information is defined and provided in session management (SM) subscription data of the UDM according to an embodiment of the present disclosure.

FIG. 3 illustrates a method in which an AMF selects again S-NSSAI for a PDU session through alternative S-NSSAI information in a PDU session establishment procedure when alternative S-NSSAI information is defined and provided in session management (SM) subscription data of an UDM according to an embodiment of the present disclosure.

With reference to FIG. 3, a UE 301 may include and transmit a PDU session establishment request message in a NAS message to an AMF 303 (through a base station 302) for a PDU session establishment procedure (step 310). The NAS message means a message between the UE 301 and the AMF 303. The NAS message may include at least one of S-NSSAI, a DNN, or a PDU session ID.

The AMF 303 may select an SMF 305 based on at least one of the DNN or the S-NSSAI (step 320).

The AMF 303 may transmit an Nsmf_PDUSession_CreateSMContext request (which may include at least one of S-NSSAI, a DNN, a PDU session ID, or a PDU session establishment request message) to the SMF 305 (step 330).

When the S-NSSAI included in the message received from the AMF 303 is an NSAC target, the SMF 305 may transmit an Nnsacf_NSAC_NumOfPDUsUpdate request (which may include at least one of S-NSSAI, a UE ID, a PDU session ID, and an update flag=INCREASE) message to an NSACF 306 (step 340).

When an update flag value of the received message is INCREASE, and the number of PDU sessions established for the S-NSSAI of the received message has already reached the maximum number of PDU sessions established for the S-NSSAI, the NSACF 306 may include information indicating that the maximum number of PDU sessions established for the corresponding S-NSSAI has already been reached in the result value and is unavailable and transmit the information to the SMF 305 (step 345). In this case, the message may be an Nnsacf_NSAC_NumOfPDUsUpdate response message.

The SMF 305 may transmit an Nudm_SDM_Get request (which may include at least one of SUPI, a DNN, S-NSSAI, or SM subscription data) to an UDM 308 to request SM subscription data of the UE 301 (step 350). In this case, information requesting alternative S-NSSAI(s) may be included in the Nudm_SDM_Get request message in the following case: determination according to a local configuration of the SMF 305, in the case that a UE registration procedure in progress is a registration due to a movement from a first system (e.g., EPS) to a second system (e.g., 5GS), in the case that a response message in step 345 includes information that S-NSSAI is unavailable, and the like The UDM 308 may transmit subscription information including alternative NSSAI(s) for S-NSSAI included in the message received from the SMF 305 in the Nudm_SDM_Get response message to the SMF 305 (step 355). The UDM 308 may include alternative S-NSSAI(s) in the following cases: determination according to a local configuration of the UDM 308 and in the case that the SMF 305 requests alternative S-NSSAI(s), and the like.

In this case, according to an embodiment, the UDM 308 may obtain information to transmit to the SMF 305 from the UDR (not illustrated) and transmit the information to the AMF 303.

The SMF 305 may transmit an Nsmf_PDUSession_CreateSMContext response message to the AMF 303 (step 360). In this case, a cause of the message may include information indicating that SM context creation has failed due to reaching the maximum number of PDU sessions established for S-NSSAI and alternative S-NSSAI(s).

When information indicating that SM context creation has failed due to reaching the maximum number of PDU sessions established for the S-NSSAI and alternative S-NSSAI(s) is included in a cause value of the message from the SMF 305, the AMF 303 may select one of S-NSSAI(s) included in allowed NSSAI among alternative S-NSSAI(s) for the failed S-NSSAI to attempt again PDU session creation (step 370).

The AMF 303 may select again an SMF based on the newly selected S-NSSAI (step 380).

The AMF 303 may transmit an Nsmf_PDUSession_CreateSMContext request message to the newly selected SMF 305 (step 390). FIG. 3 illustrates several SMFs as one SMF for convenience of description. The SMF newly selected by the AMF 303 in step 380 may be an SMF different from that selected by the AMF 303 in step 320.

The remaining PDU session creation procedure may be proceeded (step 395).

In one embodiment illustrated in FIG. 3, because an alternate slice is provided through the UDM 308 that provides subscriber information for the session in the PDU session procedure, there is an advantage that an alternate slice may be provided based on information on a subdivided session of the subscriber.

Figure 4:
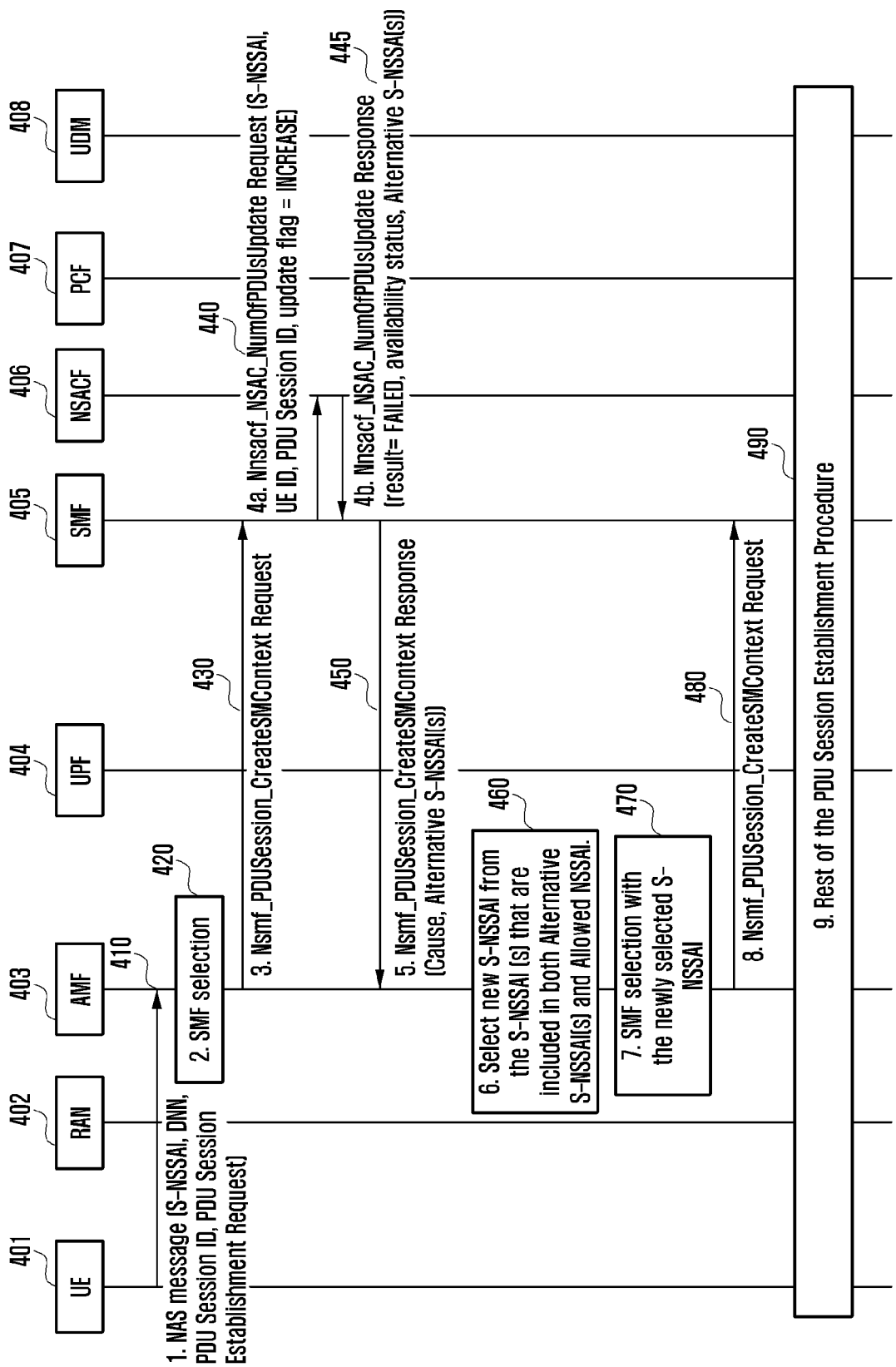
FIG. 4 illustrates a method in which an AMF selects again S-NSSAI for a PDU session through alternative S-NSSAI information in a PDU session establishment procedure when alternative S-NSSAI information is defined and provided in an NSAC function (NSACF) according to an embodiment of the present disclosure.

FIG. 4 illustrates a method in which an AMF selects again S-NSSAI for a PDU session through alternative S-NSSAI information in a PDU session establishment procedure when alternative S-NSSAI information is defined and provided in an NSACF according to an embodiment of the present disclosure.

With reference to FIG. 4, a UE 401 may include and transmit a PDU session establishment request message in a NAS message to an AMF 403 (through a base station 402)

for a PDU session establishment procedure (step 410). The NAS message means a message between the UE 401 and the AMF 403. The NAS message may include at least one of S-NSSAI, a DNN, or a PDU session ID.

The AMF 403 may select an SMF 405 based on at least one of the DNN or the S-NSSAI (step 420).

The AMF 403 may transmit an Nsmf_PDUSession_CreateSMContext request (which may include at least one of S-NSSAI, a DNN, a PDU session ID, or a PDU session establishment request message) to the selected SMF 405 (step 430).

When the S-NSSAI included in the message received from the AMF 403 is an NSAC target, the SMF 405 may transmit an Nnsacf_NSAC_NumOfPDUsUpdate request (which may include at least one of S-NSSAI, a UE ID, a PDU session ID, or an update flag=INCREASE) message to an NSACF 406 (step 440).

In this case, information requesting alternative S-NSSAI(s) may be included in the Nnsacf_NSAC_NumOfPDUsUpdate request message in the following cases: determination according to a local configuration of the SMF 405, in the case that a UE registration procedure in progress is a registration due to a movement from a first system (e.g., EPS) to a second system (e.g., 5GS).

When an update flag value of the received message is INCREASE, and the number of PDU sessions established for S-NSSAI of the Nnsacf_NSAC_NumOfPDUsUpdate request message has already reached the maximum number of PDU sessions established for the S-NSSAI, the NSACF 406 may include a value indicating that the maximum number of PDU sessions established has already been reached in the result value to transmit the result value to the SMF 405 (step 445). Further, the NSACF 406 may include alternative S-NS SAI(s) in the following cases: in the case that the S-NSSAI included in the message from the SMF 405 is unavailable, determination according to a local configuration of the NSACF 406, in the case that alternative S-NSSAI(s) is requested from the SMF 405, and the like The NSACF 406 may include S-NSSAI(s) that have not reached the maximum number of PDU sessions established among stored alternative S-NSSAI(s) for the corresponding S-NSSAI, or S-NSSAI(s) that are not the target of NSAC NSSAI(s) in alternative S-NSSAI(s) of a message transmitting to the SMF 405.

The SMF 405 transmits an Nsmf_PDUSession_CreateSMContext response message to the AMF 403 (step 450). In this case, a cause of the message may include information indicating that SM context creation has failed due to reaching the maximum number of PDU sessions established for the S-NSSAI and alternative S-NSSAI(s) received in step 445.

When information indicating that SM context creation has failed due to reaching the maximum number of PDU sessions established for the S-NSSAI and alternative S-NSSAI(s) is included in a cause value of the message from the SMF 405, the AMF 403 may select one of S-NSSAI(s) included in allowed NSSAI among alternative S-NSSAI(s) for the failed S-NSSAI to attempt again PDU session creation (step 460).

The AMF 403 may select again an SMF based on the newly selected S-NSSAI (step 470).

The AMF 403 may transmit an Nsmf_PDUSession_CreateSMContext request message to the newly selected SMF 405 (step 480). FIG. 4 illustrates several SMFs as one SMF for convenience of description. The SMF newly selected by the AMF 403 in step 470 may be an SMF different from that selected by the AMF 403 in step 420.

The remaining PDU session creation procedure may be proceeded (step 490).

In one embodiment illustrated in FIG. 4, because the NSACF 406 knowing load information on network slices provides an alternative slice (e.g., alternative-SNSSAI) for the PDU session, there is an advantage that it is possible to determine/provide an alternative slice in consideration of a load on the network slices. For example, the NSACF 406 may provide an alternate slice with the remaining sufficiently large number of allowable PDU sessions to the SMF 405.

Figure 5:
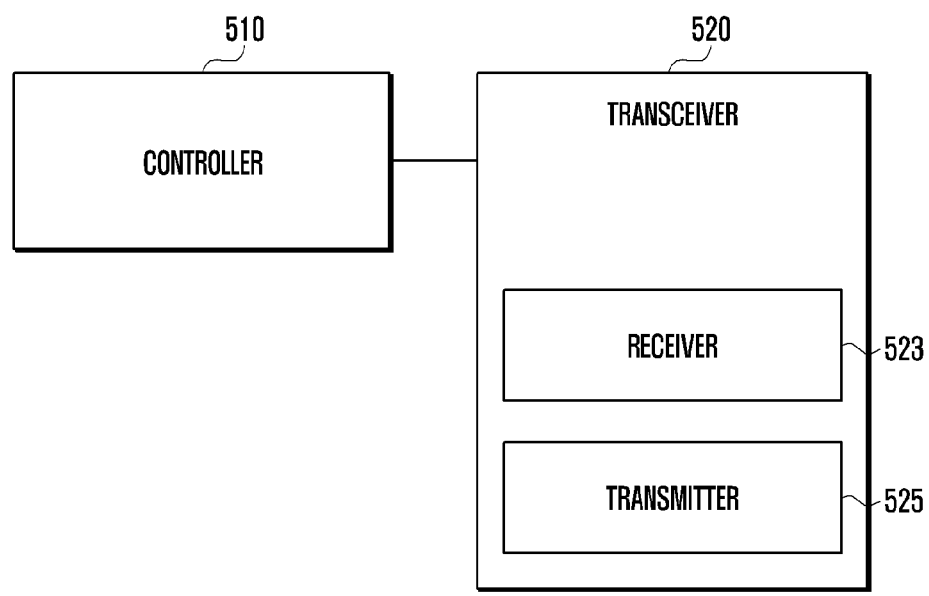
FIG. 5 illustrates a constitution of a UE according to an embodiment of the present disclosure.

FIG. 5 illustrates a constitution of a UE according to an embodiment of the present disclosure.

With reference to FIG. 5, the UE according to an embodiment of the disclosure may include a transceiver 520 and a controller 510 for controlling overall operations thereof. The transceiver 520 may include a transmitter 525 and a receiver 523.

The transceiver 520 may transmit and receive signals to and from other network entities.

The controller 510 may control the UE to perform any one operation of the above-described embodiments. The controller 510 and the transceiver 520 do not necessarily have to be implemented into separate modules, and may be implemented into a single component in the form of a single chip. The controller 510 and the transceiver 520 may be electrically connected. For example, the controller 510 may be a circuit, an application-specific circuit, or at least one processor. Further, operations of the UE may be realized by providing a memory device storing the corresponding program code in an arbitrary component in the UE.

Figure 6:
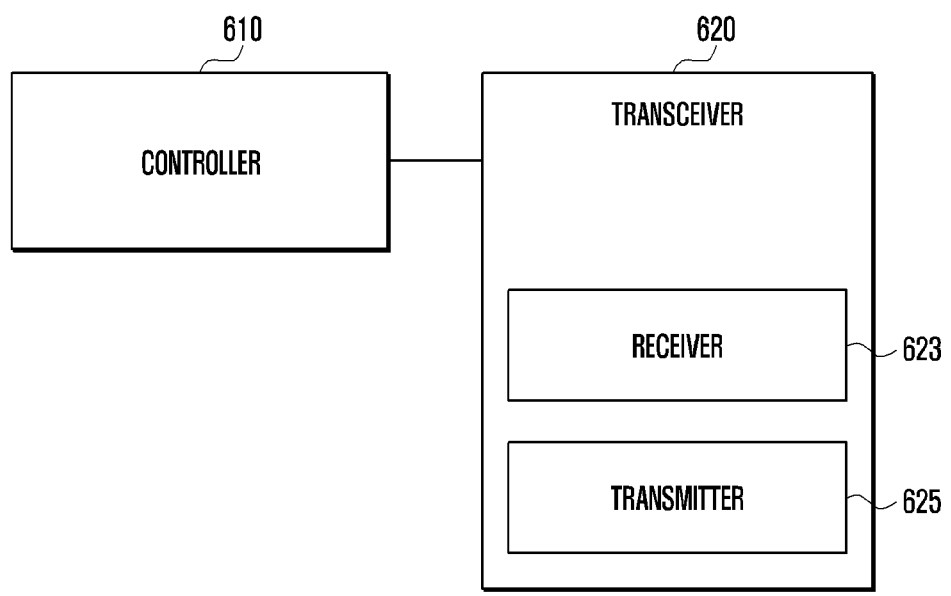
FIG. 6 illustrates a constitution of a network entity according to an embodiment of the present disclosure.

FIG. 6 illustrates a constitution of a network entity according to an embodiment of the disclosure.

The network entity of the disclosure is a concept including a network function according to system implementation.

With reference to FIG. 6, a network entity according to an embodiment of the disclosure may include a transceiver 620 and a controller 610 for controlling overall operations of the network entity. The transceiver 620 may include a transmitter 625 and a receiver 623.

The transceiver 620 may transmit and receive signals to and from other network entities.

The controller 610 may control the network entity to perform any one operation of the above-described embodiments. The controller 610 and the transceiver 620 do not necessarily have to be implemented into separate modules, and may be implemented into a single component in the form of a single chip. The controller 610 and the transceiver 620 may be electrically connected. For example, the controller 610 may be a circuit, an application-specific circuit, or at least one processor. Further, operations of the network entity may be realized by providing a memory device storing the corresponding program code in an arbitrary component in the network entity.

The network entity may be any one of a base station (RAN), AMF, SMF, UPF, PCF, NSACF, UDM, and UDR.

It should be noted that the constitution diagrams illustrated in FIGS. 1 to 6, diagrams of a control/data signal transmission method, operation procedure diagrams, and constitution diagrams are not intended to limit the scope of the disclosure. That is, all components, entities, or steps of operation described in FIGS. 1 to 6 should not be construed as essential components for implementation of the disclosure, and the disclosure may be implemented within a range that does not impair the essence of the disclosure even by including only some components.

The operations of the network entity or the UE described above may be realized by providing a memory device storing the corresponding program code in an arbitrary component in the network entity or the UE device. That is, a controller of the UE device or the network entity may execute the above-described operations by reading and executing a program code stored in the memory device by a processor or a central processer (CPU).

Various components and modules of the network entity, base station, or UE device described in this specification may be operated using a hardware circuit such as a combination of a complementary metal oxide semiconductor-based logic circuit, firmware, software, and/or hardware and firmware and/or software inserted into a machine readable medium. For example, various electrical structures and methods may be implemented using electrical circuits such as transistors, logic gates, and application specific integrated circuits.

In the detailed description of the disclosure, although specific embodiments have been described, various modifications are possible without departing from the scope of the disclosure. Therefore, the scope of the disclosure should not be limited to the described embodiments and should be defined by the claims described below as well as by those equivalent to the claims.

According to an embodiment of the disclosure, a situation in which a protocol data unit (PDU) session creation request is rejected due to network slice admission control (NSAC) through alternative network slice technology in a 5G system can be alleviated or prevented. Alternative network slice technology may be utilized as shown in following examples.

In one example, a network manager can create a session through an alternate slice in the case that an initially requested network slice is unavailable. Therefore, there is an advantage that availability for the network slice is improved.

In another example, when a session is concentrated in a specific network slice, the network manager can obtain the effect of distributing a load between network slices by enabling to use an alternate slice for new session requests requesting the corresponding network slice.

In yet another example, the network manager can prevent the corresponding session creation requests from being rejected by providing an alternate slice for session creation requests in which a session creation request should not be rejected due to a unusable reason of the network slice (e.g., emergency call service, national security/regulation related service, and the case that a session established in an environment in which NSAC is not supported is moved to an environment in which NSAC is supported).

Effects obtainable in the disclosure are not limited to the above-mentioned effects, and other effects not mentioned will be clearly understood by those of ordinary skill in the art to which the disclosure belongs from the description below.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by an access and mobility management function (AMF) in a communication system, the method comprising:
receiving, from a terminal, a first message for requesting an establishment of a protocol data unit (PDU) session associated with a network slice;
identifying whether the network slice is not available;
in case that the network slice is not available, selecting an alternative network slice alternative to the network slice;
selecting a session management function (SMF) based on the alternative network slice; and
transmitting, to the SMF selected based on the alternative network slice, a second message for establishing the PDU session, the second message comprises information on the alternative network slice.

2. The method of claim 1, wherein the alternative network slice is selected from at least one allowed network slice.

3. The method of claim 1, wherein the first message comprises information on the network slice and the information on the network slice comprises single-network slice selection assistance information (S-NSSAI) of the network slice, and
wherein the information on the alternative network slice included in the second message comprises S-NSSAI of the alternative network slice.

4. The method of claim 1, further comprising:
receiving, from a unified data management (UDM), information on at least one network slice and information on at least one alternative network slice associated with each of the at least one network slice.

5. The method of claim 1, wherein the identifying whether the network slice is not available comprises:
receiving, from a SMF, a third message comprising information indicating whether the network slice is not available; and
identifying whether the network slice is not available based on the information indicating whether the network slice is not available, and
wherein the third message further comprises information on the alternative network slice that is alternative to the network slice.

6. The method of claim 3, wherein the first message further comprises at least one of a request data network name (DNN), a PDU session identity, or a PDU session establishment request message, and
wherein the second message further comprises at least one of the requested DNN, the PDU session identity, or the PDU session establishment request message.

7. The method of claim 1, wherein, in case that a number of established PDU session is equal to a maximum number of PDU sessions for the network slice or a number of registered terminals is equal to a maximum number of available terminals for the network slice, the network slice is not available.

8. An access and mobility management function (AMF) in a communication system, the AMF comprising:
a transceiver; and
a controller coupled with the transceiver and configured to:
receive, from a terminal, a first message for requesting an establishment of a protocol data unit (PDU) session associated with a network slice,
identify whether the network slice is not available, in case that the network slice is not available, select an alternative network slice alternative to the network slice,
select a session management function (SMF) based on the alternative network slice, and
transmit, to the SMF selected based on the alternative network slice, a second message for establishing the PDU session, the second message comprises information on the alternative network slice.

9. The AMF of claim 8, wherein the alternative network slice is selected from at least one allowed network slice.

10. The AMF of claim 8, wherein the first message comprises information on the network slice and the information on the network slice comprises single-network slice selection assistance information (S-NSSAI) of the network slice, and
wherein the information on the alternative network slice included in the second message comprises S-NSSAI of the alternative network slice.

11. The AMF of claim 8, wherein the controller is further configured to:
receive, from a unified data management (UDM), information on at least one network slice and information on at least one alternative network slice associated with each of the at least one network slice.

12. The AMF of claim 8, wherein the controller is further configured to:
receive, from a SMF, a third message comprising information indicating whether the network slice is not available; and
identify whether the network slice is not available based on the information indicating whether the network slice is not available, and
wherein the third message further comprises information on the alternative network slice that is alternative to the network slice.

13. The AMF of claim 10, wherein the first message further comprises at least one of a request data network name (DNN), a PDU session identity, or a PDU session establishment request message, and
wherein the second message further comprises at least one of the requested DNN, the PDU session identity, or the PDU session establishment request message.

14. The AMF of claim 8, wherein, in case that a number of established PDU session is equal to a maximum number of PDU sessions for the network slice or a number of registered terminals is equal to a maximum number of available terminals for the network slice, the network slice is not available.

* * * * *